Figure 1:
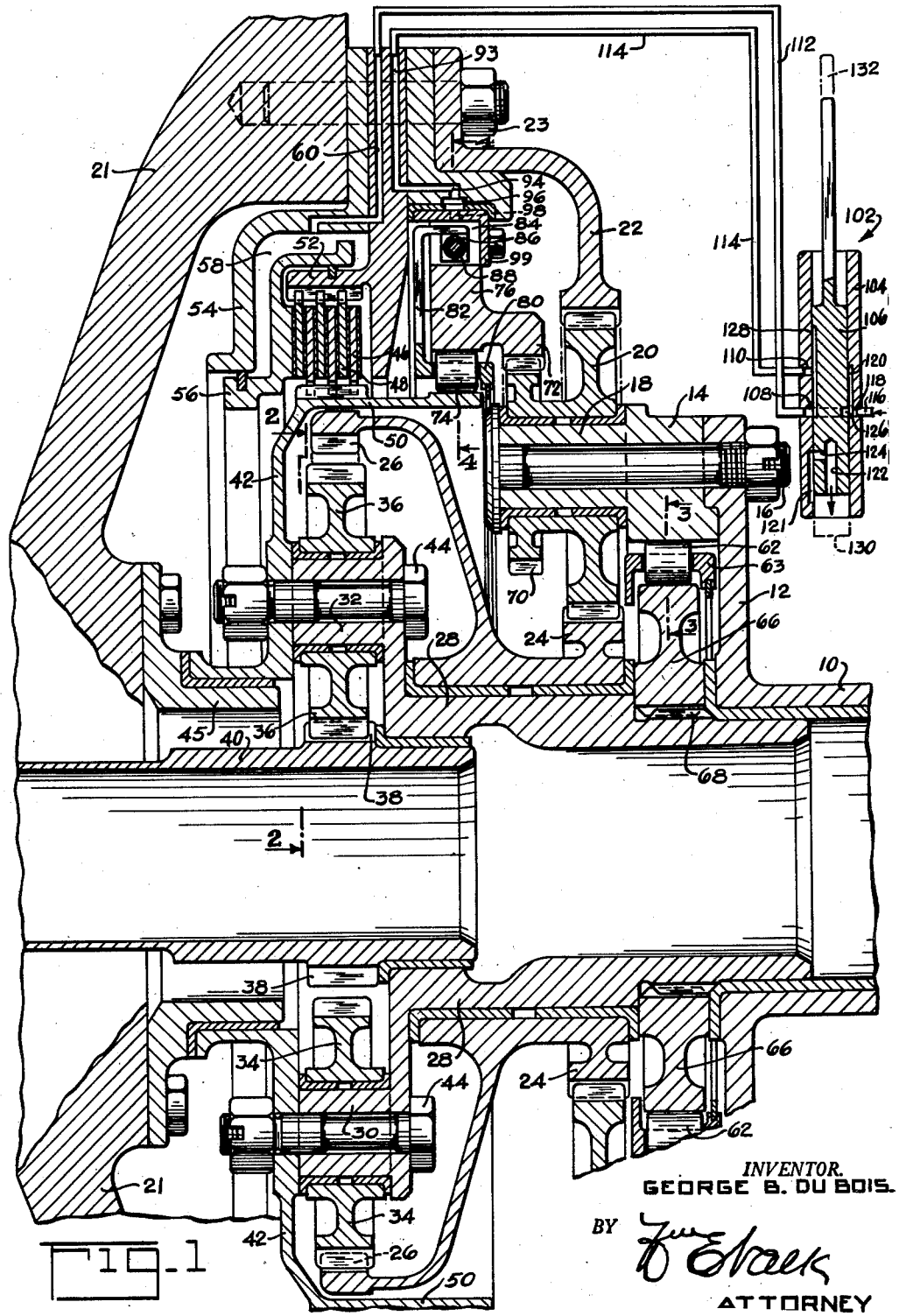

May 8, 1951     G. B. DU BOIS     2,552,000
MULTISPEED TRANSMISSION
Filed Jan. 9, 1946     4 Sheets-Sheet 2
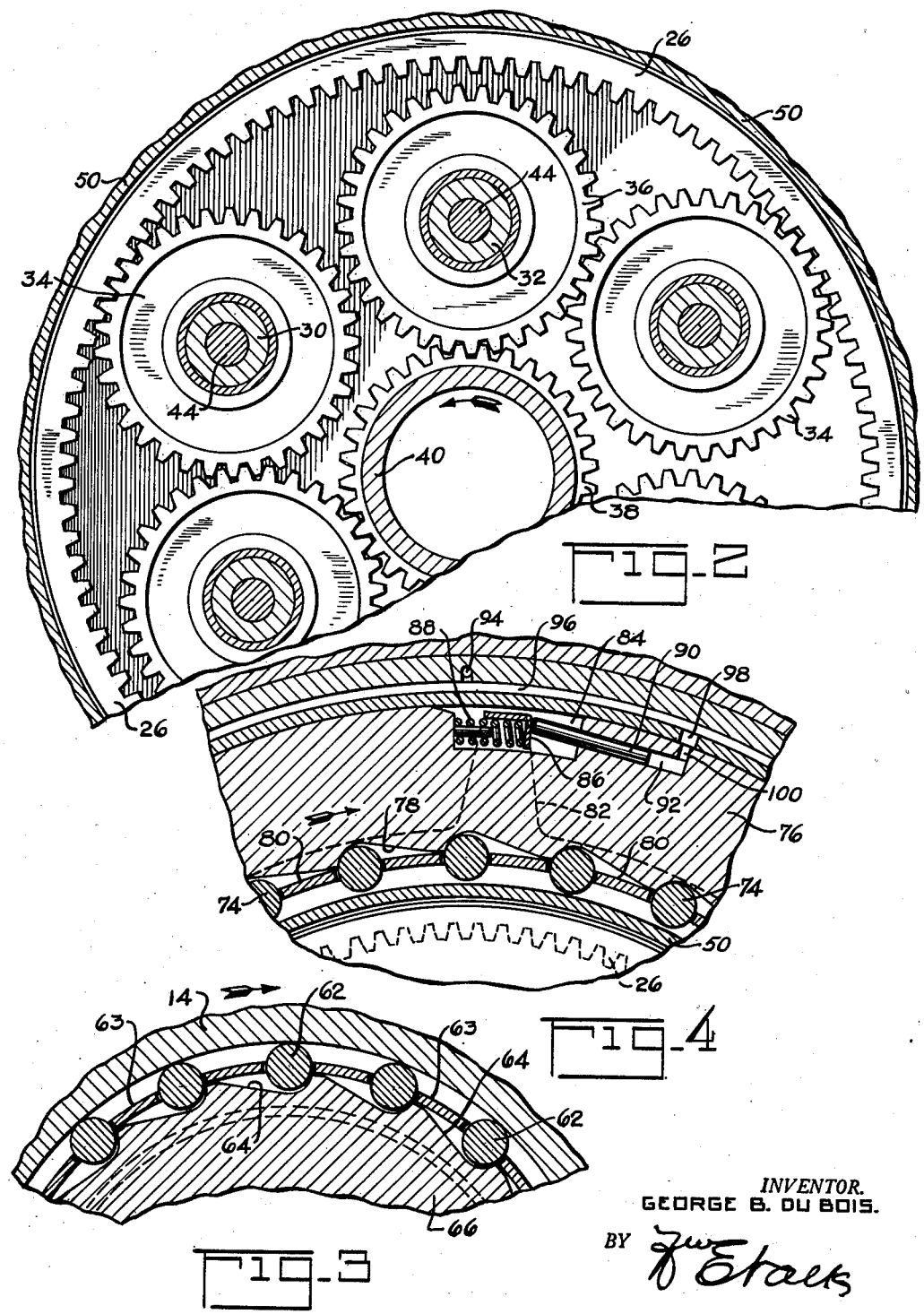
INVENTOR.
GEORGE B. DU BOIS.
BY
ATTORNEY

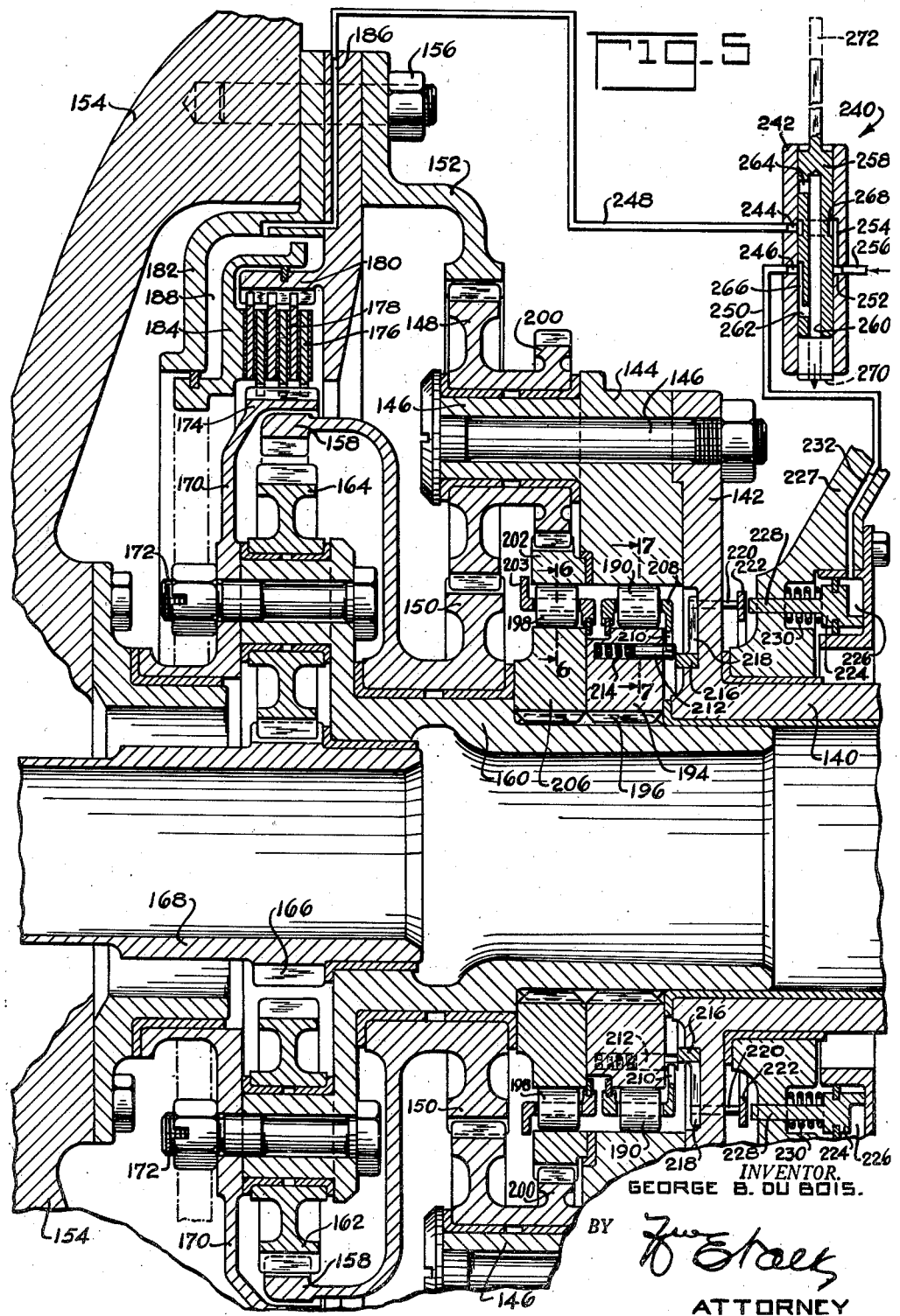

May 8, 1951 G. B. DU BOIS 2,552,000
MULTISPEED TRANSMISSION

Filed Jan. 9, 1946 4 Sheets-Sheet 4

INVENTOR
GEORGE B. DU BOIS.
BY
ATTORNEY

Patented May 8, 1951

2,552,000

UNITED STATES PATENT OFFICE 2,552,000

MULTISPEED TRANSMISSION

George B. Du Bois, Radburn, N. J., assignor to Wright Aeronautical Corporation, a corporation of New York Application January 9, 1946, Serial No. 640,074

6 Claims. (Cl. 74—764)

This invention relates to multi-speed transmissions and is a continuation-in-part of co-pending application Serial No. 609,432 filed August 7, 1945 by Davis et al. The invention, as illustrated, has been designed for driving a supercharger of an internal combustion engine but, as will appear, the invention is not limited to this specific use and instead is of general application.

The aforementioned co-pending application discloses a two-speed planetary transmission in which the speed changing clutches and/or brakes have relatively low engaging speeds, the planet pinions have only light bearing loads and, at both speed ratios, the gears are in continuous rolling engagement. This two-speed planetary transmission comprises a primary speed step-up from an input shaft to a planetary gear train which, in turn, provides a further speed step-up to the output shaft. The two-speed ratios of the transmission are obtained by locking the reaction member of said planetary gear train to a fixed structure or to a member rotating at the speed of the input shaft.

It is an object of this invention to provide a novel three-speed transmission embodying the basic combination of said aforementioned two-speed transmission and having the same desirable characteristics as said two-speed transmission. Specifically, the invention comprises a speed step-up from the input shaft to the input member of a planetary gear train and, as in the aforementioned two-speed transmission, this planetary gear train provides a further speed step-up to an output shaft. The three-speed ratios are obtained by locking the reaction member of said planetary gear train to a fixed structure or to one or the other of two rotating members and, preferably, one of these members rotates at the speed of said input shaft.

Other objects of this invention will become apparent upon reading the annexed detailed description in connection with the drawing in which:

Figure 1 is an axial sectional view through a transmission embodying the invention;

Figures 2, 3 and 4 are sectional views respectively taken along lines 2—2, 3—3 and 4—4 of Figure 1;

Figure 5 is a view similar to Figure 1 but of a modification; and

Figure 7:
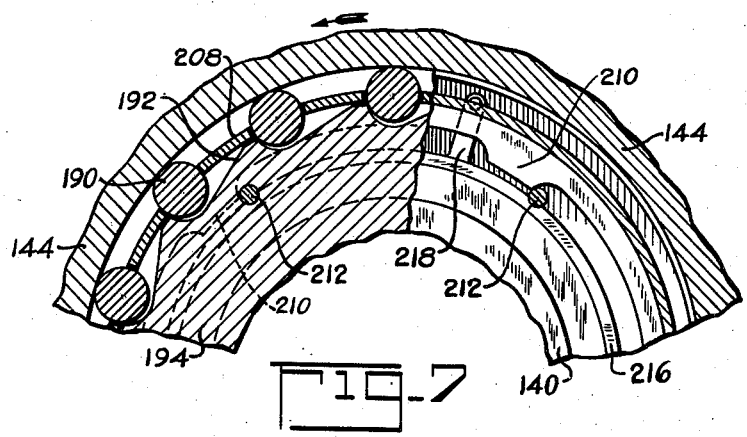
Figure 6:
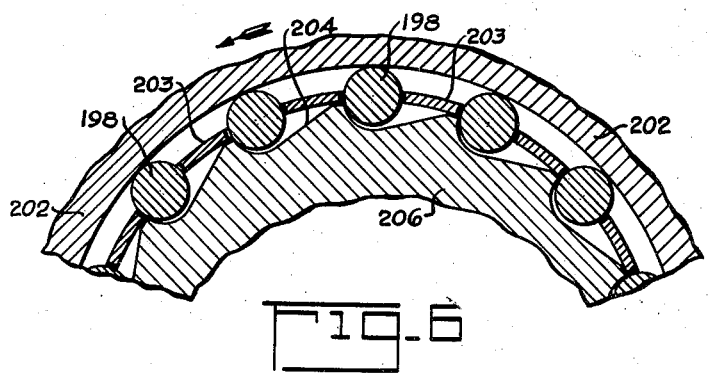

Figures 6 and 7 are sectional views taken along lines 6—6 and 7—7 of Figure 5.

Referring to the drawing, a drive transmitting input shaft 10 is provided with a flange 12 to which a plate 14 is secured by bolts 16. The plate 14 is provided with a plurality of studs 18 about which planet pinions 20 are journaled. The pinions 20 are disposed in meshing engagement between an internal gear 22 and a sun gear 24. The internal gear 22 is secured to a housing 21 by nuts 23 and the sun gear 24 has an internal gear 26 formed integral therewith. A planet carrier 28 is provided with a plurality of studs 30 and 32 about which planet pinions 34 and 36 are respectively journaled. As best seen in Figure 2, the planet pinions 34 and 36 are disposed in pairs in engagement with each other with the pinion 34 meshing with the internal gear 26 and the pinion 36 meshing with the sun gear 38 formed integral with an output shaft 40. A plate 42 is secured to the planet carrier 28 by bolts 44 and is piloted on a drum 45 secured to the fixed housing 21.

A friction brake is provided for releasably locking the planet carrier 28, 42 against rotation. The friction brake comprises a plurality of frictionally engageable plates 46 and 48 alternately disposed and respectively splined to the rim 50 of the planet carrier plate 42 and to a drum 52 secured to the housing 21 by the bolts 23. An annular member 54 is also secured to the housing 21 by the bolts 23 and a piston 56 is slidable relative to the annular member 54 to clamp the plates 46 and 48 together upon application of a fluid pressure through a passage 60 to a chamber 58 between the piston 56 and the member 54. When the friction plates 46 and 48 are clamped together, a step-up drive is provided by the planet pinions 34 and 36 from the internal gear 26 to the output shaft 40.

The arrangement of the planet pinions 34 and 36 in pairs with one meshing with the internal gear 26 and the other with the sun gear 38 results in rotation of the output shaft 40 in the same direction of rotation as the internal gear 26. This construction reduces the load on the friction plates 46 and 48 as compared to a construction in which each planet pinion directly meshes with the internal gear 26 and the sun gear 38 since, with this latter arrangement, the output shaft 40 would rotate in a direction opposite to that of the internal gear 26.

When the brake plates 46 and 48 are disengaged, the planet carrier 28, 42 starts to rotate in the same direction as the input shaft 10—that is, clockwise as indicated in Figure 3. The planet carrier 28, 42 is restrained against rotating at a speed greater than that of the input shaft 10 by a one-way clutch comprising rollers 62. The rollers 62 are disposed in a cage 63 between the internal cylindrical surface of the plate 14 and the cam surfaces 64 on a cam member 66 splined to the planet carrier 28 at 68. Accordingly, when the friction plates 46 and 48 are disengaged, the planet carrier 28, 42 is restrained against rotating at a speed greater than that of the input shaft 10 thereby providing a second step-up drive ratio from the internal gear 26 to the output shaft 40, which step-up ratio is less than the step-up ratio provided when the planet carrier 28, 42 is locked against rotation.

The construction so far described is quite similar to that disclosed in the aforementioned copending application of Davis et al. With the present invention, a second one-way clutch is provided so that, when the friction plates 46 and 48 are disengaged, the planet carrier 28, 42 can be restrained against rotation at a speed greater than either the speed of the input shaft 10 or some other predetermined speed. To this end, relatively small planet pinions 70 are formed integral with the pinions 20 and are disposed in meshing engagement with an internal gear 72.

With this construction, the internal gear 72 is driven at a speed less than the speed of the input shaft 10. A one-way clutch comprising rollers 74 is disposed between the rim 50 of the planet carrier plate 42 and the rim 76 of the internal gear 72. The rollers 74 are disposed between the cam surfaces 78 formed on the rim 76 of the internal gear 72 and the cylindrical outer surface of the planet carrier rim 50. The cam surfaces 78 are disposed so that the rollers 74 are adapted to prevent the planet carrier 28, 42 from rotating at a speed greater than the speed of the internal gear 72 thereby providing an intermediate step-up drive ratio from the internal gear 26 to the output shaft 40.

It is necessary to provide some means to lock the one-way clutch rollers 74 in their inoperative position otherwise the speed of the planet carrier 28, 42 could never exceed that of the internal gear 72 and the one-way clutch rollers 62 would never function. To this end, a cage 80 for the rollers 74 is provided with a plurality of radially extending fingers 82 each having a portion extending into one of a plurality of slots 84 cut out of the rim 76 of the internal gear 72. These fingers each provide a thrust plate 86 within their associated slots 84. Springs 88, disposed between one wall of the slots and their associated thrust plates 86, are effective to urge the roller cage and its rollers 74 toward contact between the cam surfaces 78 and the planet carrier rim 50. Plungers 90 are adapted to urge the thrust plates against the springs 88 upon application of fluid pressure to cylinders 92 formed in the gear rim 76 and within which the plungers 90 are slidable. Fluid pressure is adapted to be supplied to the cylinders 92 through passages 93, 94, annular groove 96, and alined passages 98 and 100 to the cylinders 90. The radial passages 93 are formed in a ring 99 secured about the rim of the gear 72. When fluid pressure is supplied to the cylinders 92, the plungers 90 act against the springs 88 to hold the roller cage 80 and rollers 74 in their inoperative position illustrated in Figure 4.

A valve 102 is provided to control the application of fluid pressure to the plungers 90 and to the piston 56. As illustrated, the valve 102 comprises a sleeve 104 having a valve plug 106 axially slidable therein. A radial passage 108 in the sleeve 104 is in communication with the cylinder 58 via conduit 112 and passage 60 and a radial passage 110 in the sleeve 104 is in communication with the cylinders 92 via conduit 114, passages 93, 94, annular groove 96 and passages 98 and 100. A suitable fluid, such as lubricating oil, is supplied under pressure to the valve 102 through a conduit 116 opening into a radial passage 118 and a longitudinal groove 120 within the sleeve 104. The sleeve 104 is also provided with a longitudinal internal groove 121. The valve plug 102 has a central drain passage 122, a radial passage 124 extending therefrom, an annular external groove 126 and a longitudinal groove 128 extending therefrom.

In the position of the valve 102, illustrated in Figure 1, fluid under pressure is supplied from the conduit 116 to the annular and longitudinal grooves 126 and 128 in the valve plug and thence through conduits 112, 114 to the annular chamber 58 and cylinders 92. Accordingly, with the valve in this position, the plungers 90 are effective to maintain the one-way clutch rollers 74 in their inoperative position as illustrated in Figure 4. At the same time, the friction brake plates 46 and 48 are engaged to lock the planet carrier 28, 42 against rotation whereupon the planet pinions 34 and 36 provide the high step-up drive ratio from the internal gear 26 to the output shaft 40.

Upon downward movement of the valve plug 106 (Figure 1) to the dotted-line position indicated at 130, the longitudinal groove 128 in the valve plug now places both radial passages 108 and 110 in communication with the longitudinal groove 121 which, in turn, is connected to the drain passage 122 through the passage 124. Accordingly, both conduits 112 and 114 are now connected to the drain passage 122 thereby effecting disengagement of the friction plates 46 and 48 and relieving the plungers 90 of pressure. The spring 88 then moves the rollers 74 into engagement between the cam surfaces 78 and the rim 50 of the planet carrier. At the same time, the planet carrier 28, 42 starts to rotate in the same direction as the gear 72. When the speed of the planet carrier 28, 42 starts to exceed that of the gear 72, the rollers 74 in effect lock the carrier to the gear 72 to prevent any further increase in the speed of the carrier relative to the gear 72 thereby providing the intermediate step-up drive ratio from the internal gear 26 to the output shaft 40. Upon return of the valve plug 106 to the position illustrated in Figure 1, the friction brake plates 46 and 48 are again engaged to lock the planet carrier 28, 42 against rotation, whereupon rotation of the internal gear 72 disengages the rollers 74 and the fluid pressure applied to the plungers 90 holds the rollers in their inoperative position illustrated in Figure 4. Upon upward movement of the valve plug 106 to the dotted-line position, indicated at 132, fluid pressure is supplied to the cylinders 92 against the plungers 90 via annular groove 126, conduit 114, etc. thereby holding the rollers 74 in their inoperative position. At the same time, the annular chamber 58 is relieved of pressure by communication with the drain passage 122 via passage 124, conduit 112, etc., thereby effecting disengagement of the friction plates 46 and 48. Accordingly, the planet carrier starts to rotate and, since the rollers 74 are being held in their inoperative position, the planet carrier accelerates until its speed reaches the speed of the input shaft 10. The one-way clutch rollers 62 then engage to restrain the planet carrier 28, 42 against any further increase in the speed relative to the input shaft 10 thereby providing the low step-up drive ratio from the internal gear 26 to the output shaft 40.

At this point, it should be noted that it is within the scope of this invention to reverse the operation of the springs 86 and plungers 90 such that the springs 86 would normally urge the rollers 74 toward the position illustrated in Figure 1 and the plungers 90 would be adapted, upon the application of fluid pressure to the cylinders 92, to move the rollers into engagement between the cam surfaces 78 and the planet carrier rim 50.

With the construction of Figures 1 to 4, the transmission comprises gearing providing a speed step-up drive from an input shaft to the input member 26 of a planetary gear train together with first means adapted to hold the planet carrier 28, 42 of said gear train stationary, second means adapted to prevent rotation of the planet carrier of said gear train at a speed in excess of a first predetermined speed and third means adapted to prevent rotation of said planet carrier at a speed in excess of a second predetermined speed. As illustrated in Figures 1 to 4, this first predetermined speed is the low speed of the gear 72 and the second predetermined speed is the higher speed of the input shaft 10. With this construction, the planet carrier is the reaction member of said planetary gear train and this carrier never rotates at a speed greater than the speed of the input shaft so that the planet pinions are never subjected to large centrifugal forces whereby the bearing loads are never large. Also, the clutches and brakes have low engaging speeds and in all of the speed ratios all the gears are in continuous rolling engagement.

With the above construction, the planet carrier 28, 42 provides the reaction torque for the planet pinions 34 and 36. Instead of controlling the speed of rotation of the planet carrier 28, 42 by the clutches and brakes, it is also within the scope of this invention to drivably connect the planet carrier to the gear 20 and to control the speed of rotation of the internal gear 26 by the clutches and brakes as disclosed in the aforementioned application of Davis et al. in the case of the two-speed transmission. Thus in Figure 5 of said Davis et al. application the brake and one-way clutch control the pinion carrier member 150 of a planetary gear train and the internal gear 130 of said gear train constitutes its input member while in Figure 1 of said application the brake and one-way clutch control the internal gear 52 of a planetary gear train and the pinion carrier member 30 of said latter gear train constitutes its input member. Figure 1 of the present invention is similar to Figure 5 of said Davis et al. application except for the addition of a second one-way clutch 74 and associated gearing. Accordingly it seems clear that Figure 1 of the present invention could be modified so as to be similar to Figure 1 of the Davis et al. application whereby the internal gear instead of the planet carrier member would be controlled by the brake and one-way clutches and said carrier member instead of said internal gear would constitute the input member of its planetary gear train.

Figures 5 to 7 illustrate a modification generally similar to Figures 1 to 4 in that means are provided to lock the planet carrier against rotation or to restrain the carrier against rotation at a speed in excess of the speed of the input shaft. However, in Figures 5 to 7, a third speed is provided by restraining the carrier against rotation at a speed greater than some speed higher than the speed of the input shaft instead of, as in Figures 1 to 4, at a speed less than the speed of the input shaft.

Referring now to Figures 5 to 7, an input shaft 140 is provided with an annular flange 142 to which a plate 144 is secured by bolts 146. The plate 144 is provided with a plurality of studs 146 projecting therefrom and about which planet pinions 148 are journaled. The planet pinions 148 are disposed between a sun gear 150 and an internal gear 152 secured to the fixed housing structure 154 by nuts 156. The sun gear 150 is formed integral with an internal gear 158. A planet carrier 160 is provided with a plurality of meshing pairs of planet pinions 162 and 164 with the planet pinions 162 also meshing with the internal gear 158 and with the planet pinions 164 also meshing with the sun gear 166 formed on an output shaft 168. The arrangement of the planet pinions 162 and 164 is similar to the arrangement of the planet pinions 34 and 36 in Figures 1 and 2.

A plate 170 is secured to the planet carrier 160 by bolts 172. A friction brake engageable with the rim 174 of the plate 170 is provided for locking the planet carrier 160, 170 against rotation. The friction brake comprises a plurality of frictionally engageable plates 176 and 178 alternately disposed and respectively splined to the planet carrier rim 174 and to a drum 180 secured to the housing 154 by the bolts 156. An annular member 182 is also secured to the housing 154 by the bolts 156 and a piston 184 is slidable relative to the annular member 182 to clamp together the frictionally engageable plates 176 and 178 upon the application of fluid pressure through the passage 186 to the chamber 188 between the piston 184 and the annular member 182.

When the brake plates 176, 178 are disengaged, the planet carrier 160, 170 starts to rotate in the same direction as the input shaft 140—that is, counterclockwise as viewed in Figures 6 and 7. One-way clutch rollers 190, when engaged, are arranged to restrain the planet carrier 160, 170 against rotation at a speed faster than that of the input shaft 140. The rollers 190 are disposed between an internal cylindrical surface on the plate 144 and cam surfaces 192 on a cam member 194 splined to the planet carrier 160 at 196. A second set of one-way clutch rollers 198, when engaged, are arranged to restrain the planet carrier 160, 170 against rotation at a predetermined speed faster than that of the input shaft 140. To this end, small planet pinions 200 are formed integral with the planet pinions 148 and are disposed in meshing engagement with a sun gear 202 which thereby rotates at a speed faster than that of the input shaft 140. The one-way clutch rollers 198 are disposed in a cage 203 between the internal cylindrical surface of the sun gear 202 and cam surfaces 204 on the cam member 206 also splined to a planet carrier 160.

With this construction, the friction brake plates 176 and 178, when engaged, provide a high step-up drive ratio from the internal gear 158 to the output shaft 168; the one-way clutch rollers 190, when engaged, provide an intermediate step-up drive ratio; and the one-way clutch rollers 198, when engaged, provide a low step-up drive ratio. Before the one-way clutch rollers 198 can engage, it is necessary to provide some means to render the rollers 190 inoperative. To this end, the rollers 190 are disposed in a cage 208 having a plurality of radially inwardly extending fingers 210. Also a plurality of plungers 212 are slidably mounted in the cam member 194 and are urged outwardly by springs 214. The plungers 212, when projecting outwardly, as illustrated in Figure 5, engage the fingers 210 to prevent rotation of the rollers 190 into engagement between the cam surfaces 192 and the internal cylindrical surface of the plate 144 thereby maintaining the rollers in their inoperative position. With the plungers 212 in this position, when the friction brake plates 176 and 178 are disengaged, the planet carrier 160, 170 accelerates until it is rotating at the speed of the sun gear 202 whereupon the rollers 198 engage to prevent any further increase in speed.

The plungers 212 are pressed outwardly by the springs 214 into engagement with a ring 216 having fingers 218. Each of the fingers 218 is formed integral with the ring 216 and disposed in a groove in the flange 142. Pins 220 secured to the fingers 218 project through the flange 142 and a ring 222 is secured across the ends of the pins 220. An annular piston 224 is slidably mounted in a cylinder 226 formed in a fixed housing structure 227 and a plurality of piston rods 228 extend therefrom toward engagement with the ring 222. Springs 230 are provided to urge the piston 224 away from the ring 222. When fluid pressure is applied to the cylinder 226 through a passage 232, the piston 224 moves to the left (Figure 5) to move the ring 222 and therefore the ring 216 to the left to depress the pins 212, thereby freeing the roller cage 208. If the friction plates 176 and 178 are now disengaged, the planet carrier 160, 170 only accelerates until it reaches the speed of the input shaft 140 whereupon the rollers 190 engage to prevent any further increase in the speed of the planet carrier relative to the input shaft.

A valve 240 is provided to control the operation of the pistons 184 and 224. As illustrated, the valve 240 comprises a sleeve 242 having a pair of spaced radial passages 244 and 246 respectively connected to the cylinders 188, 226 through conduits 248 and 250. The sleeve 242 is also provided with a radial passage 252 and a longitudinal groove 254 extending therefrom and to which a suitable fluid under pressure is supplied by conduit 256. A valve plug 258 is slidably disposed in the sleeve 242. The valve plug is provided with a central drain passage 260, a pair of radial passages 262 and 264, a longitudinal groove 266 extending from the radial passage 262 and an annular groove 268 about the valve plug 258.

With the valve plug 258 in the position illustrated in Figure 5, fluid pressure is supplied to the cylinder 188 from the supply conduit 256 via longitudinal groove 254, annular groove 268, conduit 248 and passage 186. Accordingly, the friction brake plates 176 and 178 are engaged to hold the planet carrier 160, 170 stationary thereby placing the transmission in its high step-up drive ratio. If the valve plug 258 is now moved downwardly, to its dotted-line position indicated at 270, the cylinder 188 is connected to the drain passage 260 via conduit 248 and passage 264 thereby disengaging the brake plates 176 and 178 to free the planet carrier 160, 170. At the same time, fluid pressure is admitted to the cylinder 226 via annular groove 268, conduit 250 and passage 232 to move the piston 224 to the left thereby depressing the pins 212 and freeing the roller cage 208. As soon as the planet carrier 160, 170 accelerates to the speed of the input shaft 140, the rollers 190 engage to prevent any further increase in speed of the planet carrier whereby the transmission is in its intermediate step-up speed ratio.

Upon return movement of the valve plug 258 to the position illustrated in Figure 5, the friction plates 176 and 178 are again engaged to hold the planet carrier 160, 170 stationary whereupon rotation of the plate 144, relative to the now stationary cam member 194, frees and moves the rollers 190 to the inoperative position and the springs 214 move the pins 212 outwardly for cooperation with the cage fingers 210 to hold the rollers 190 in this inoperative position.

If the valve plug 258 is now moved upwardly, to the dotted-line position indicated at 272 in Figure 5, both cylinders 188 and 226 are connected to the drain passage 260 through the longitudinal groove 266 and passage 262. Accordingly, the friction plates 176 and 178 are again disengaged and the one-way clutch rollers 190 are maintained in their inoperative position by the pins 212. The planet carrier 160, 170 accelerates until it reaches the speed of the gear 202 whereupon the rollers 198 engage to prevent any further increase in speed of the planet carrier. The transmission is then in its low step-up speed ratio.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. In a multi-speed transmission; a planetary gear train comprising an input member, an output member and a rotatable torque reaction member; a brake engageable to prevent rotation of said reaction member, said reaction member being arranged to rotate in the direction of the reaction torque acting thereon upon disengagement of said brake during transmission of torque by said gear train; first means including a one-way clutch selectively engageable upon disengagement of said brake to constrain said reaction member to rotation at a first predetermined speed; and second means including a one-way clutch selectively engageable upon disengagement of said brake to constrain said reaction member to rotation at a second predetermined speed in the direction of said reaction torque, said first and second predetermined speeds differing from each other and each differing from the speeds of said input and output members.

2. In a multi-speed transmission; a planetary gear train comprising an input member, an output member and a rotatable torque reaction member; a brake engageable to prevent rotation of said reaction member, said reaction member being arranged to rotate in the direction of the reaction torque acting thereon upon disengagement of said brake during transmission of torque by said gear train; a pair of rotatable members; gearing connecting each of said rotatable members to one of said input and output members for rotation in the direction of said reaction torque at a speed differing from the speed of the other rotatable member and from the speeds of said input and output members; a first clutch selectively engageable upon disengagement of said brake to constrain said reaction member to rotation with one of said rotatable members; and a second clutch selectively engageable upon disengagement of said brake to constrain said reaction member to rotation with the other of said rotatable members.

3. In a multi-speed transmission; a planetary gear train comprising an input member, an output member and a rotatable torque reaction member; a brake engageable to prevent rotation of said reaction member, said reaction member being arranged to rotate in the direction of the reaction torque acting thereon upon disengagement of said brake during transmission of torque by said gear train; a pair of rotatable members; gearing connecting each of said rotatable members to one of said input and output members for rotation in the direction of said reaction torque at a speed differing from the speed of the other rotatable member and from the speeds of said input and output members; a first one-way clutch selectively engageable upon disengagement of said brake to constrain said reaction member to rotation with one of said rotatable members; and a second one-way clutch selectively engageable upon disengagement of said brake to constrain said reaction member to rotation with the other of said rotatable members.

4. In a multi-speed transmission as recited in claim 3 and including means for controlling the operation of said brake and clutches such that when one of said clutches is in engagement said brake must be engaged before the other of said clutches can be engaged.

5. In a multi-speed transmission; an input shaft; a planetary gear train comprising an input member, an output member and a rotatable torque reaction member; means to provide a step-up drive from said input shaft to said input member; a brake engageable to prevent rotation of said reaction member, said reaction member being arranged to rotate in the direction of the reaction torque thereon upon disengagement of said brake; a rotatable member; gearing connecting said rotatable member to said input shaft and input member for rotation at a speed less than that of said shaft, said rotatable member and input shaft being rotatable in the same direction as said reaction torque; a first clutch selectively engageable upon disengagement of said brake to constrain said reaction member to rotation with said rotatable member; and a second clutch selectively engageable upon disengagement of said brake to constrain said reaction member to rotation with said input shaft.

6. In a multi-speed transmission; an input shaft; a planetary gear train comprising an input member, an output member and a rotatable torque reaction member; means to provide a step-up drive from said input shaft to said input member; a brake engageable to prevent rotation of said reaction member, said reaction member being arranged to rotate in the direction of the reaction torque thereon upon disengagement of said brake; a rotatable member; gearing connecting said rotatable member to said input shaft and input member for rotation at a speed less than that of said shaft, said rotatable member and input shaft being rotatable in the same direction as said reaction torque; a first one-way clutch selectively engageable upon disengagement of said brake to constrain said reaction member to rotation with said rotatable member; and a second one-way clutch selectively engageable upon disengagement of said brake to constrain said reaction member to rotation with said input shaft.

GEORGE B. DU BOIS.

REFERENCES CITED

The following references are of record in the file of this patent:

UNITED STATES PATENTS

| Number | Name | Date |
|---|---|---|
| 1,791,393 | Viale | Feb. 3, 1931 |
| 2,099,675 | Cutler | Nov. 23, 1937 |
| 2,263,159 | Berger | Nov. 18, 1941 |
| 2,301,072 | Nardone | Nov. 3, 1942 |
| 2,473,157 | Lucia et al. | June 14, 1949 |